United States Patent
Okuda et al.

(10) Patent No.: US 8,685,573 B2
(45) Date of Patent: Apr. 1, 2014

(54) CATHODE ACTIVE MATERIAL AND LITHIUM ION RECHARGEABLE BATTERY USING THE MATERIAL

(75) Inventors: Yuki Okuda, Hitachi (JP); Norio Iwayasu, Hitachinaka (JP); Hidetoshi Honbou, Hitachinaka (JP)

(73) Assignee: Hitachi Maxell, Ltd., Osaka (JP)

( * ) Notice: Subject to any disclaimer, the term of this patent is extended or adjusted under 35 U.S.C. 154(b) by 113 days.

(21) Appl. No.: 13/368,359

(22) Filed: Feb. 8, 2012

(65) Prior Publication Data

US 2012/0308890 A1    Dec. 6, 2012

(30) Foreign Application Priority Data

May 30, 2011    (JP) .................................. 2011-119842

(51) Int. Cl.
*H01M 10/0562*    (2010.01)
*H01M 6/18*    (2006.01)
*H01M 4/131*    (2010.01)

(52) U.S. Cl.
CPC .............. *H01M 6/181* (2013.01); *H01M 4/131* (2013.01); *Y02E 60/122* (2013.01)
USPC ........... 429/323; 429/322; 429/212; 429/213; 429/231.95

(58) Field of Classification Search
CPC ..... H01M 6/181; Y02E 60/122; H01M 4/131
USPC ...................... 429/322, 323, 212, 213, 231.95
See application file for complete search history.

(56) References Cited

U.S. PATENT DOCUMENTS

| | | | |
|---|---|---|---|
| 2004/0202930 A1* | 10/2004 | Armand et al. | 429/213 |
| 2008/0311472 A1 | 12/2008 | Yamaguchi et al. | |
| 2011/0159368 A1* | 6/2011 | Hirose et al. | 429/219 |
| 2012/0091403 A1 | 4/2012 | Okuda | |

FOREIGN PATENT DOCUMENTS

| | | |
|---|---|---|
| JP | 08-236114 | 9/1996 |
| JP | 11-265719 | 9/1999 |
| JP | 2007-173064 | 7/2007 |
| JP | 2009-21229 | 1/2009 |
| JP | 2012-89312 | 5/2012 |

OTHER PUBLICATIONS

Communication mailed Sep. 3, 2013, in connection with Japanese Patent Application No. 2011-119842, 2 pages; Japanese Patent Office, Japan.

* cited by examiner

*Primary Examiner* — Patrick Ryan
*Assistant Examiner* — Ben Lewis
(74) *Attorney, Agent, or Firm* — Antonelli, Terry, Stout & Kraus, LLP.

(57) ABSTRACT

Provided is a lithium ion rechargeable battery less suffering from swelling even when stored at high temperatures. Disclosed are a cathode active material, a cathode for a lithium ion rechargeable battery using the cathode active material, and a lithium ion rechargeable battery using the cathode. The cathode active material includes particles, each of the particles including a cathode material capable of intercalating and deintercalating lithium ions, and a film formed on at least part of surfaces of the particles. The film includes a compound represented by Chemical Formula (1). Examples of the compound represented by Chemical Formula (1) include lithium squarate and dilithium squarate. Preferably, the lithium ion rechargeable battery is a prismatic battery.

11 Claims, No Drawings

CATHODE ACTIVE MATERIAL AND LITHIUM ION RECHARGEABLE BATTERY USING THE MATERIAL

CLAIM OF PRIORITY

The present application claims priority from Japanese Patent Application JP 2011-119842 filed on May 30, 2011, the content of which is hereby incorporated by reference into this application.

FIELD OF THE INVENTION

The present invention relates to a cathode active material, as well as a cathode for a lithium ion rechargeable battery and a lithium ion rechargeable battery each using the cathode active material.

BACKGROUND OF THE INVENTION

An interest in energy storage devices has recently been growing.

Lithium ion rechargeable batteries, nickel-cadmium batteries, and nickel-metal hydride rechargeable batteries are widely used as power sources typically for portable intelligent communicators such as cellular phones and notebook-size personal computers, and for video cameras and portable music players. Among the batteries, lithium ion rechargeable batteries, which are superior in properties such as high energy density and high output density, have been rapidly investigated and developed since the debut thereof, and have established themselves as standard batteries for these consumer appliances.

With increase in functionality of these portable intelligent communicators, lithium ion rechargeable batteries (hereinafter also simply referred to as "batteries" (or "a battery")) serving as power sources require further higher energy densities, i.e., require further higher capacities. In addition, they require longer cycle lives in consideration of environmental standpoints.

In general, a lithium ion rechargeable battery includes a cathode, an anode, a separator, and a nonaqueous electrolyte solution. For example, the cathode and the anode may each be prepared by mixing an active material, a conductive material for imparting electrical conductivity, and a binder for binding these components in a solvent, and applying the mixture to a current collector. The prepared cathode and anode are laid on each other via a separator, wound as a roll, inserted into a battery can (battery casing), in which an electrolyte solution containing an electrolytic salt dissolved in a nonaqueous solvent (organic solvent) is poured. Lids are then attached to the battery casing via insulating gaskets, and the battery casing is hermetically sealed to produce a battery.

Batteries thus prepared are often used at operating voltages of from 4.2 V to 2.5 V. Nickel-metal hydride rechargeable batteries, lead-acid batteries, and other batteries using water as the electrolyte generally have a limited rated voltage in the range of from 1.2 V to 2.0 V as a single cell, because water has a theoretical electrolytic potential of 1.229 V. The fact that a single cell of the lithium ion rechargeable battery can have a voltage higher than the theoretical electrolytic potential of water significantly owes to excellent electrochemical properties typically of the nonaqueous electrolyte solution and separator.

Such lithium ion rechargeable batteries may have higher capacities typically by increasing the mass of coating of the active material in the cathode and anode per unit area or by increasing the charge voltage. In addition to these measures, various techniques have been investigated to allow batteries to have higher capacities.

However, when repeatedly charged and discharged at a high capacity and at an upper limit of the operating voltage, a battery may suffer from capacity degradation, thus resulting in a shorter battery life. Independently, when stored and/or used in a high-temperature environment, gas is generated inside the battery to increase the inside pressure of the battery. This causes the battery to deform or causes the inner electrolyte to leak. The pressure rise also causes problems such as a malfunction in a safety mechanism which operates by the action of the pressure inside the battery.

To solve or avoid these problems, for example, Japanese Unexamined Patent Application Publication (JP-A) No. H08-236114 discloses a method for improving charge/discharge cycle properties of a battery by providing a metal oxide layer on the surface of a cathode active material. JP-A No. 2007-173064 discloses a technique for suppressing the decomposition of a nonaqueous electrolyte solution by providing a compound layer.

However, when a metal oxide layer is provided on the surface of an active material as in the technique disclosed in JP-A No. H08-236114, the presence of this layer impedes the diffusion of lithium ions and substantially prevents a current to pass through, resulting in a lower battery capacity.

Even when a layer capable of permeating lithium ions is formed as the technique disclosed in JP-A No. 2007-173064, the layer does not have an activity of suppressing gas generation inside the battery.

Accordingly, an object of the present invention is to provide a cathode active material, a cathode for a lithium ion rechargeable battery using the cathode active material, and a lithium ion rechargeable battery using the cathode, each of which less suffers from gas generation and thereby less causes battery swelling.

SUMMARY OF THE INVENTION

To achieve the above object, the present invention provides the followings:

(A) Specifically, the present invention provides a cathode active material including particles, each of the particles including a cathode material capable of intercalating and deintercalating lithium ions; and a film being formed on at least part of surfaces of the particles, wherein the film includes a compound represented by Chemical Formula (1):

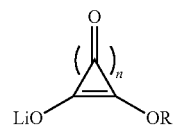

(1)

wherein n is an integer of from 1 to 5 and R represents lithium (Li) or hydrogen (H).

(B) Preferably, in the cathode active material according to (A), the film further includes a compound represented by Chemical Formula (2):

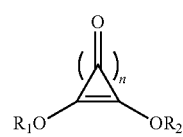

(2)

wherein n is an integer of from 1 to 5, $R_1$ represents an alkali metal other than lithium, and $R_2$ represents an alkali metal or hydrogen.

(C) Preferably, in the cathode active material according to (A), $A_2CO_3$ or AOH is formed on at least part of the surfaces of the particles, where A represents an alkali metal.

(D) Preferably, in the cathode active material according to (A), the cathode material includes nickel.

(E) The present invention further provides, in an aspect, a cathode for a lithium ion rechargeable battery. The cathode includes the cathode active material according to any one of (A) to (D), wherein the compound represented by Chemical Formula (1) is included in an amount of more than 0.001 part by weight and less than 10 parts by weight per 100 parts by weight of the cathode material.

(F) The present invention provides, in still another aspect, a cathode for a lithium ion rechargeable battery. The cathode includes the cathode active material according to any one of (A) to (D), wherein the compound represented by Chemical Formula (1) is included in an amount of 0.01 part by weight or more and 5 parts by weight or less per 100 parts by weight of the cathode material.

(G) The present invention also provides a lithium ion rechargeable battery including the cathode according to (E) or (F), an anode, and an electrolyte.

(H) Preferably, the lithium ion rechargeable battery according to (G) is a prismatic battery.

The present invention provides a lithium ion rechargeable battery which less suffers from the decomposition of the electrolyte solution and the reaction between alkali metal deposits and the electrolyte solution, and thereby less causes gas generation inside the battery when stored in a high-temperature environment. Further objects, features, and advantages of the present invention will be apparent from the following description of the preferred embodiments.

DETAILED DESCRIPTION OF THE PREFERRED EMBODIMENTS

The present invention will be illustrated in detail below.

1. Cathode for Lithium Ion Rechargeable Battery (i) Cathode Active Material

A cathode active material according to the present invention includes particles including a cathode material capable of intercalating (occluding) and deintercalating (releasing) an electrode reactant, and a layer (film) formed on at least part of the particles. The layer (film) includes a compound represented by Chemical Formula (1):

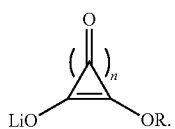
(1)

As used herein, the term "electrode reactant" refers to lithium or lithium ion (s), and the term "cathode material" refers to a compound capable of intercalating and deintercalating lithium and lithium ions. Examples of the compound include metal oxides including at least lithium element. More specifically, examples of the compound include lithium-cobalt multicomponent oxides including Li and Co, such as $LiCoO_2$, and $Li_xCo_{(1-y)}M_yO_2$ and other lithium-cobalt-containing transition metal multicomponent oxides including at least one transition metal represented by M in addition to Li and Co, where x satisfies the condition $0 \leq x \leq 1.2$, y satisfies the condition $0 \leq y < 1$, and M is at least one metal element selected from the group consisting of Al, Mg, Mn, Fe, Ni, Cu, Zn, Ti, Ge, W, and Zr, preferably M being at least one metal element selected from the group consisting of Mn, Ni, and Al. Examples of the compound further include lithium-nickel-containing transition metal multicomponent oxides corresponding to the above-mentioned compounds except for containing Ni instead of Co.

The surface layer of the particles including the cathode material may include at least one carbonate and/or hydroxide selected from the group consisting of $A_2CO_3$ and AOH (hereinafter the carbonate and hydroxide being referred to as "alkali metal deposit" as appropriate), where "A" represents an alkali metal, such as $Li_2CO_3$ and/or LiOH. The alkali metal "A" is preferably lithium so as to make LiOH and $Li_2CO_3$ harmless, LiOH and $Li_2CO_3$ having a possibility to gasify. When such an alkali metal deposit is present on the surface of the particles including the cathode material, the alkali metal deposit has higher chemical stability by formation of a layer of the compound of Chemical Formula (1) on the alkali metal deposit or by reaction of the compound of Chemical Formula (1) with the deposit. The particles may include the cathode material alone, and may include another material or other materials in addition to the cathode material.

Exemplary cathode materials capable of intercalating and deintercalating the electrode reactant further include lithium-containing multicomponent oxides represented by $Li_xMO_2$ or $Li_yM_2O_4$ wherein x satisfies the condition $0 \leq x \leq 1$, y satisfies the condition $0 \leq y \leq 2$, and M represents at least one metal element selected from the group consisting of Al, Mg, Mn, Fe, Co, Cu, Zn, Ti, Ge, W, and Zr; spinel oxides; metal chalcogenides having a layered structure; and compounds having an olivine structure.

An active material containing Ni as M withdraws lithium in a larger amount from the structure upon charging of the battery up to 4.2 V and thereby allows the battery to have a higher capacity, as compared to other active materials containing, for example, Co as M. On the other hand, this active material has inferior chemical stability because of withdrawing of lithium in a large amount. In addition, nickel is highly reactive, decomposes the electrolyte solution in a larger amount, and thereby causes gas generation more significantly. For these reasons, the use of an active material according to the present invention in a battery containing Ni as M further suppresses gas generation, thus providing higher advantages.

Examples of such active materials include metal oxides including lithium cobalt oxides (e.g., $LiCoO_2$), lithium manganese oxides (e.g., $LiMn_2O_4$), lithium titanium oxides (e.g., $Li_{4/3}Ti_{5/3}O_4$), manganese dioxide, vanadium pentoxide, and chromium oxide; materials having an olivine crystal structure, such as $LiMPO_4$ where M is Fe, Mn, and/or Ni; and metal sulfides, such as titanium disulfide and molybdenum disulfide. Each of such cathode materials may be used alone or in combination thereof.

According to some production processes, an active material is produced by adding lithium in excess of a desired stoichiometric ratio. The resulting active material produced according to these processes contains a large amount of unreacted lithium remaining as lithium hydroxide and/or lithium carbonate. In addition, a metal oxide is highly active on its surface, and this may cause a side reaction between the active material and the solvent to cause gas generation.

Examples of active materials applicable to this case include an active material including an alkali metal deposit on the surface thereof in an amount of 0.01% or more, preferably 0.1% or more and 1% or less, and containing nickel in a content of 50% or more as a transition metal compound, i.e., an active material represented by $Li_xNi_\alpha M_{(1-\alpha)}O_2$ where x satisfies the condition $0 \leq x \leq 1.2$, a satisfies the condition $0.5 \leq \alpha < 1$, and M represents at least one metal element selected from the group consisting of Al, Mg, Mn, Fe, Co, Cu, Zn, Ti, Ge, W, and Zr, preferably at least one metal element selected from the group consisting of Mn, Co, and Al. In addition to the above, decomposition reactions may proceed upon the use of some types of solvents, because the battery is charged at a high potential of from 3.8 V to 4.9 V (vs. metal lithium). The present invention is expected to exhibit significant advantageous effects particularly upon the use of the above-mentioned active materials (cathode materials) and solvents.

The cathode material as above may be prepared and used according to conventional methods. Typically, a compound serving as the cathode material may be prepared by mixing component elements as appropriate and firing the mixed component elements using a suitable process or device. The prepared compound may be subjected to a suitable process of pulverization and/or granulation. The compound may also be converted into particles having a desired particle size or into secondary particles having a desired particle size distribution. While the cathode material has been described above, it should be noted that the preparation method of the cathode material is not limited to the above description in the present invention.

(ii) Film

A compound to constitute the film relating to the present invention is represented by Chemical Formula (1). In the formula, n is an integer of from 1 to 5, and R is hydrogen (H) or lithium (Li). Depending on R, the compound of Chemical Formula (1) can be in two or more forms. The layer formed on the surface of the active material may include the compound of Chemical Formula (1) in a specific form alone or may include the compound in two or more forms. In addition, the layer may include the compound of Chemical Formula (1) and a decomposed product thereof. The configurations of lithium and R in the chemical formula are indicated for convenience, and there is no problem when the relation between them is reversed. Gas generation is suppressed by protecting the surface of the active material (cathode material) having high activity with the compound of Chemical Formula (1). The compound of Chemical Formula (1) is preferably at least one selected from the group consisting of lithium deltate, lithium squarate, lithium croconate, lithium rhodizonate, lithium heptagonate, dilithium deltate, dilithium squarate, dilithium croconate, dilithium rhodizonate, and dilithium heptagonate.

Each of these compounds may be prepared typically by a neutralization titration process in which an oxocarbonic acid as a starting material is neutralized with lithium, or a process of subjecting a salt of oxocarbonic acid with an alkali metal other than lithium, as a starting material, to ion exchange of the alkali metal with lithium. Examples of such alkali metal include alkali metals selected from the group consisting of sodium and potassium. When a lithium salt is to be obtained by ion exchange using any of these alkali metals and alkaline earth metals, the film may include any of these alkali metals and alkaline earth metals which have been not undergone ion exchange in the production process. Specifically, the film may further include, in addition to the compound of Chemical Formula (1), at least one selected from the group consisting of disodium deltate, disodium squarate, disodium croconate, disodium rhodizonate, disodium heptagonate, dipotassium deltate, dipotassium squarate, dipotassium croconate, dipotassium rhodizonate, and dipotassium heptagonate. Although these compounds of Chemical Formula (2) may also be expected to exhibit effects of increasing the chemical stability of the cathode active material as with the compounds of Chemical Formula (1), lithium salts obtained from these compounds of Chemical Formula (2) through ion exchange are expected to exhibit further satisfactory effects, because such lithium salts are expected to exhibit better effects and superior.

For example, dilithium rhodizonate may be prepared by treating rhodizonic acid dihydrate with lithium hydroxide monohydrate in isopropanol to give a suspension, filtering the suspension to collect precipitates, and drying the collected precipitates. Dilithium squarate may be prepared typically by neutralizing an aqueous solution of lithium hydroxide with squaric acid.

Using the compound of Chemical Formula (1) helps a lithium compound to gasify before the completion of battery production and thereby prevents the lithium compound to be incorporated into the battery, the lithium compound being formed by a reaction of the cathode active material with water and oxygen or carbon dioxide. A salt of the compound of Chemical Formula (1), if remained in the battery, helps to improve conductivity of lithium ions and thereby helps the battery have a high charge/discharge efficiency.

(iii) Application or Formation of Film

As used herein, the term "film" refers to a layer containing the material compound of Chemical Formula (1). The way to provide the film on the cathode material is not limited and may be any known process. Typically, a film including the compound of Chemical Formula (1) may be formed on at least part of the cathode material by mixing the cathode material described in (i) and the compound of Chemical Formula (1) with each other. Exemplary devices for use in this process include ball mills, jet mills, mortar machines, and planetary mixers. The process may be performed with adding a liquid component such as water or ethanol. Alternatively, the film may also be formed, for example, by dispersing the material substances using a suitable dispersion medium such as water or ethanol and mixing them in the dispersion medium, or by neutralization titration.

Typically, a cathode active material including at least lithium squarate and/or dilithium squarate as a film can be obtained by treating a material containing LiOH and/or $Li_2CO_3$ of the cathode materials listed in (i) as an alkali metal deposit with squaric acid in water.

The film may also be formed by dip coating, in which the compound of Chemical Formula (1) is dispersed in a dispersion medium (solvent), and the cathode active material is dipped in the dispersion medium and then retrieved. Alternatively, the film may be formed through coating or dip coating on an electrode which has been prepared according to a known procedure. Specifically, the film may be formed by performing the step of providing a film including the compound of Chemical Formula (1) on the cathode material after the step of forming the cathode in a production process of the cathode.

The way to provide the film is not limited to the above processes, and each of different processes may be used alone or in combination thereof. The resulting cathode active material enables efficient permeation of lithium ions and has higher chemical stability, because the film including the compound of Chemical Formula (1) is formed on at least part of the particles including the cathode material.

The compound of Chemical Formula (1) is contained in the film formed on at least part of the cathode material, and is contained in an amount of preferably from 0.001 to 5 parts by weight, more preferably from 0.01 to 2 parts by weight, per 100 parts by weight of the cathode material.

The presence of the compound of Chemical Formula (1) in the produced cathode may be identified typically with a time-of-flight secondary ion mass spectrometer (TOF-SIMS), or may be identified by disassembling the lithium ion rechargeable battery using the cathode according to the present invention and subjecting the retrieved cathode to the above-mentioned measurement.

(iv) Method for Preparing Cathode

A cathode according to the present invention may be prepared by dispersing the cathode active material, a conductive material mentioned later, and a binder in a dispersion medium (solvent) to give a cathode coating ink, applying the ink to a current collector, and removing the dispersion medium.

Exemplary dispersion media include, but are not limited to, ketones such as N-methyl-2-pyrrolidone (NMP), water, and alcohols such as ethanol and methanol. NMP is preferable among them.

The application (coating) of the cathode coating ink to the current collector may be performed according to a conventional process. Typically, the cathode coating ink can be suitably applied by using a suitable coater such as a gravure coater, comma coater, slit coater, die coater, doctor blade, cast coating equipment, or spray equipment.

The coated surface of the cathode active material obtained through coating may be suitably compressed and/or ground by a leveling treatment such as pressing. The treatment may also be performed according to a conventional process such as roll pressing or flat-plate pressing. Leveling of the coated surface and/or compression of the coated layer may be performed multiple times so as to give a desired surface smoothness and a desired thickness of the coated layer. While the process for the preparation of the cathode has been described above, it should be noted that the way to prepare the cathode is not limited to the above process, and the present invention is not featured by the way to prepare the cathode.

(v) Conductive Material

The cathode mix (cathode coating ink) for constituting the cathode may further contain a conductive material so as to improve the electrical conductivity of the cathode mix layer (cathode coated layer). Exemplary conductive materials include carbon fine particles and carbon fibers. Specifically, exemplary conductive materials include carbon fine particles such as carbon black, acetylene black, channel black, thermal black, carbon nanotubes, and carbon nanohorns. The conductive materials for use herein are not limited to these materials, as long as they can impart electrical conductivity to the cathode mix, and metallic materials and electroconductive polymers may also be used.

Each of these materials may be used alone or in combination thereof. The conductive material (s) may be used in an amount of preferably from 0.1 to 10 parts by weight, more preferably from 1 to 5 parts by weight, per 100 parts by weight of the cathode material, although the amount of the conductive material(s) is not limited to the above.

(vi) Binder

The binder for use herein is not limited and may be any of binders generally used in lithium ion rechargeable batteries. Exemplary binders include polyethylenes, polypropylene, polytetrafluoroethylenes (PTFEs), polyvinylidene fluorides (PVDF), polyhexafluoropropylenes (PHFPs), styrene-butadiene rubbers (SBRs), tetrafluoroethylene-hexafluoroethylene copolymers, tetrafluoroethylene-hexafluoropropylene copolymers (FEPs), tetrafluoroethylene-perfluoroalkyl vinyl ether copolymers (PFAs), vinylidene fluoride-hexafluoropropylene copolymers, vinylidene fluoride-chlorotrifluoroethylene copolymers, ethylene-tetrafluoroethylene copolymers (ETFE resins), polychlorotrifluoroethylenes (PCTFEs), vinylidene fluoride-pentafluoropropylene copolymers, propylene-tetrafluoroethylene copolymers, ethylene-chlorotrifluoroethylene copolymers (ECTFEs), vinylidene fluoride-hexafluoropropylene-tetrafluoroethylene copolymers, vinylidene fluoride-perfluoromethyl vinyl ether-tetrafluoroethylene copolymers, ethylene-acrylic acid copolymers, ethylene-methacrylic acid copolymers, ethylene-methyl acrylate copolymers, ethylene-methyl methacrylate copolymers, cellulose derivatives (e.g., carboxymethylcellulose (CMC)), and agars. Among them, a polyvinylidene fluoride is preferably used.

The binder is contained in an amount of preferably from 0.5 to 5 parts by weight, more preferably from 1 to 5 parts by weight, per 100 parts by weight of the cathode material, although the amount of the binder is not limited to the above. Each of different binders may be used alone or in combination thereof.

2. Lithium Ion Rechargeable Battery

A lithium ion rechargeable battery according to the present invention includes the cathode for a lithium ion rechargeable battery, an anode including an active material capable of intercalating and deintercalating lithium and lithium ions, and an electrolyte solution.

The lithium ion rechargeable battery may have, for example, a prismatic (or rectangular) shape or a cylindrical shape. The lithium ion rechargeable battery to which the present invention is preferably applied has a prismatic or rectangular shape (hereinafter also simply referred to as "prismatic shape"). This is because as follows. Such a prismatic battery ununiformly deforms, as compared to a cylindrical battery, due to gas evolved inside of the battery. For example, the prismatic battery deforms in a large deformation volume in a direction perpendicular to such a plane as to give a maximum projection area. The resulting deformed battery could have dimensions larger than originally designed dimensions. For example, in the case of a cellular phone, the deformed battery, having an increased thickness, impedes the covering of a portion where the battery is mounted, thus spoiling the appearance. In addition, the exposed battery, which is not covered, may cause problems such as a short circuit or an electric shock.

(a) Anode for Lithium Ion Rechargeable Battery

An anode for the lithium ion rechargeable battery according to the present invention may employ a compound capable of intercalating and deintercalating lithium ions. Examples of such compounds include materials obtained by thermally treating graphitizable materials, derived typically from natural graphite, flaky or massive artificial graphite, petroleum coke, or coal pitch coke, at a temperature of 2500° C. or higher; mesophase pitch graphite; amorphous carbon obtained by firing, for example, furan resins such as those derived from furfuryl alcohol; carbon fibers; metals that are alloyed with lithium; and materials including carbon particles and a metal supported on the carbon particles. The metal herein may be a metal selected from the group consisting of, for example, lithium, silver, aluminum, tin, silicon, indium, gallium, and magnesium; or an alloy thereof. Any of the metals or oxides of the metals may also be used as the anode active material. Moreover, lithium titanate may also be used. Each of anode materials may be used alone or in combination.

(b) Electrolyte Solution

A nonaqueous solvent (organic solvent) to be used in the nonaqueous electrolyte solution in the present invention preferably has a high dielectric constant, esters (including carbonates) being more preferred. Among them, esters having a dielectric constant of 30 or more are recommended to be used. Exemplary esters having such a high dielectric constant include ethylene carbonate, propylene carbonate, butylene carbonate, γ-butyrolactone, and sulfur esters (for example, ethylene glycol sulfite). Cyclic esters are preferred among these, cyclic carbonates such as ethylene carbonate, vinylene carbonate, propylene carbonate, and butylene carbonate being more preferred. In addition to the above listed solvents, examples of solvents usable herein also include low-viscosity polar chain carbonates and aliphatic branched carbonate compounds typified by dimethyl carbonate, diethyl carbonate, and methyl ethyl carbonate. Above all, a solvent mixture of a cyclic carbonate (particularly ethylene carbonate) and a chain carbonate is preferred.

In addition to the above-listed nonaqueous solvents, exemplary nonaqueous solvents (organic solvent) further include chain alkyl esters such as methyl propionate; chain triester phosphates such as trimethyl phosphate; nitrile solvents such as 3-methoxypropionitrile; branched compounds having an ester bond, typified by dendrimers and dendrons.

Fluorine-containing solvents are also usable herein. Exemplary fluorine-containing solvents include (perfluoroalkyl) alkyl ethers having linear structures, such as $H(CF_2)_2OCH_3$, $C_4F_9OCH_3$, $H(CF_2)_2OCH_2CH_3$, $H(CF_2)_2OCH_2CF_3$, $H(CF_2)_2CH_2O(CF_2)_2H$, $CF_3CHFCF_2OCH_3$, and $CF_3CHFCF_2OCH_2CH_3$; and iso-(perfluoroalkyl)alkyl ethers such as 2-trifluoromethylhexafluoropropyl methyl ether, 2-trifluoromethylhexafluoropropyl ethyl ether, 2-trifluoromethylhexafluoropropyl propyl ether, 3-trifluorooctafluorobutyl methyl ether, 3-trifluorooctafluorobutyl ethyl ether, 3-trifluorooctafluorobutyl propyl ether, 4-trifluorodecafluoropentyl methyl ether, 4-trifluorodecafluoropentyl ethyl ether, 4-trifluorodecafluoropentyl propyl ether, 5-trifluorododecafluorohexyl methyl ether, 5-trifluorododecafluorohexyl ethyl ether, 5-trifluorododecafluorohexyl propyl ether, 6-trifluorotetradecafluoroheptyl methyl ether, 6-trifluorotetradecafluoroheptyl ethyl ether, 6-trifluorotetradecafluoroheptyl propyl ether, 7-trifluorohexadecafluorooctyl methyl ether, 7-trifluorohexadecafluorooctyl ethyl ether, and 7-trifluorohexadecafluorohexyl octyl ether. Any of the iso-(perfluoroalkyl)alkyl ethers may be used in combination with any of the (perfluoroalkyl)alkyl ethers having linear structures.

Preferred electrolytic salts for the nonaqueous electrolyte solution include lithium salts such as lithium perchlorate, organic boron lithium salts, lithium salts of fluorine-containing compounds, and lithium imide salts. Specific examples of such electrolytic salts include $LiClO_4$, $LiPF_6$, $LiBF_4$, $LiAsF_6$, $LiSbF_6$, $LiCF_3SO_3$, $LiCF_3CO_2$, $Li_2C_2F_4(SO_3)_2$, $LiN(CF_3SO_2)_2$, $LiN(C_2F_5SO_2)_2$, $LiC(CF_3SO_2)_3$, $LiC_NF_{2N+1}SO_3$ (where $N \geq 2$), and $LiN(RfOSO_2)_2$ where Rf represents a fluoroalkyl group. Among these lithium salts, fluorine-containing organic lithium salts are preferably used.

The electrolytic salt is contained in the nonaqueous electrolyte solution, for example, in a content of preferably 0.3 mol/L or more, and more preferably 0.7 mol/L or more, and in a content of preferably 1.7 mol/L or less, and more preferably 1.2 mol/L or less. The nonaqueous electrolyte solution, if having an excessively low electrolytic salt concentration, may have insufficient ionic conductivity; and, if having an excessively high electrolytic salt concentration, may cause precipitation of the electrolytic salt which is too much to dissolve.

The nonaqueous electrolyte solution for the present invention may further contain additives to improve battery performance. Typically, a nonaqueous electrolyte solution further containing a compound intramolecularly having a C=C unsaturated bond may further help the battery less suffer from decrease in charge/discharge cycle properties. Examples of the compound intramolecularly having a C=C unsaturated bond include aromatic compounds such as $C_6H_5C_6H_{11}$ (phenylcyclohexane); fluorinated aliphatic compounds such as $H(CF_2)_4CH_2OOCCH=CH_2$ and $F(CF_2)_8CH_2CH_2$ OOCCH=$CH_2$; and fluorine-containing aromatic compounds. Exemplary additives usable herein further include 1,3-propane sultone, 1,2-propanediol sulfate ester, and other compounds having sulfur element (for example, chain or cyclic sulfonic acid esters, and chain or cyclic sulfate esters); vinylene carbonate; vinylethylene carbonate; and fluorinated ethylene carbonate. These additives are preferably contained in an amount of, for example, 0.05 to 5 parts by weight based on the total weight of the nonaqueous electrolyte solution.

While the electrolyte solution has been described above, it should be noted that the present invention is not featured by the preparation method and composition of the electrolyte solution.

(c) Separator

A separator for the lithium ion rechargeable battery can be a separator of any material, as long as being a reinforcing material that does not adversely affect the battery, and can be any one which separates the cathode and anode from each other to prevent a short circuit. Exemplary materials for the separators include polymers such as polyolefins, polyamides, and polyesters; and glass cloths using glass fibers. Among them, polyolefins are preferably used. Exemplary polyolefins include polyethylenes and polypropylenes, and it is possible to use a plurality of films of these polymers as being laid on each other. The separator has a gas permeability (sec/100 mL) of typically 10 or more and 1000 or less, preferably 50 or more and 800 or less, and particularly preferably 90 or more and 700 or less.

While the separator has been described above, it should be noted that the present invention is not featured by configuration, material, and preparation method of the separator.

EXAMPLES

Examples of the present invention will be illustrated below in further detail. It should be noted, however, that the followings are never intended to limit the scope of the present invention, and various changes and modifications are possible without departing from the spirit and scope of the present invention.

<Preparation Method of Compound>

An example using dilithium squarate among compounds of Chemical Formula (1) for a cathode active material will be described.

An aqueous solution was prepared by dissolving 0.23 g of lithium hydroxide monohydrate in water. While measuring the pH of the aqueous solution, squaric acid was gradually added to the aqueous solution. The aqueous solution initially had a pH of 12 and showed a pH of 7 at the time when about 0.3 g of squaric acid was added, and, at this time point, the addition of squaric acid was stopped.

The resulting aqueous solution was transferred onto an evaporating dish and dried by heating. This procedure gives dilithium squarate or lithium squarate as a result of reactions represented by Formulae 1 and 2:

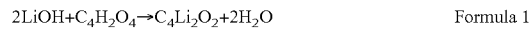

$2LiOH + C_4H_2O_4 \rightarrow C_4Li_2O_2 + 2H_2O$  Formula 1

$LiOH + C_4H_2O_4 \rightarrow C_4LiHO_2 + H_2O$  Formula 2.

In the following examples, dilithium squarate prepared according to the above procedure was used.

<Application of Film to Cathode Material>

A transition metal multicomponent oxide including lithium, nickel, cobalt, and aluminum was used as a cathode material. This cathode material was subjected to elementary analysis through atomic absorption spectrometry and was found to have a composition of $LiNi_{0.6}Co_{0.2}Al_{0.2}O_2$ (hereinafter suitably referred to as "NCA cathode material").

The cathode material and the above-prepared dilithium squarate were weighed so as to give a weight ratio of 100:1. These were placed into a bench ball mill to be subjected to dry pulverization at 100 rpm for 24 hours. A layer of dilithium squarate was formed on the NCA cathode material through a mechanochemical process.

<Preparation of Cathode>

A cathode coating ink was prepared by weighing the NCA cathode material having the film prepared by the above procedure, acetylene black as a conductive material, and a polyvinylidene fluoride as a binder in a weight ratio of 97:3:3, and dispersing them in N-methyl-2-pyrrolidone as a dispersion medium (solvent).

The resulting cathode coating ink was applied to a current collector made of an aluminum foil using a bar coater, dried to remove the medium, and pressed using a roll press machine. The pressed electrode was cut into a size of 4.9 cm$^2$ and thereby yielded a cathode. The cathode active material was applied in a coating density of 200 g/m$^2$.

<Preparation of Anode>

An anode coating ink was prepared by weighing graphite, a carbon fiber, and a PVDF in a weight ratio of 86:10:4, and dispersing them in N-methyl-2-pyrrolidone as a dispersion medium (solvent).

The anode coating ink was applied to a current collector made of a copper foil using a bar coater, dried to remove the medium, and pressed using a roll press machine so as to give a bulk density of 1.0 g/cm$^3$. The pressed electrode was cut into a size of 4.9 cm$^2$ and thereby yielded an anode.

<Electrolyte Solution>

A purchased electrolyte solution was used herein. This electrolyte solution was prepared by mixing ethylene carbonate, dimethyl carbonate, and ethyl methyl carbonate in a volume ratio of 1:1:1 and dissolving LiPF$_6$ in the mixture to a concentration of 1 mol/dm$^3$.

<Assessment of Laminated Battery>

A laminated battery was prepared by inserting a polyolefin separator into between the above-prepared cathode and anode to give a bundle of electrodes, placing the bundle of electrodes in a laminate cell prepared by using an aluminum laminate, pouring the electrolyte solution into the laminate cell, and sealing the laminate cell. The prepared laminated battery was subjected to 100 cycles of charging to 4.2 V and then discharging to 2.5 V, and properties of the laminated battery were determined.

<Assessment of Prismatic Battery>

A prismatic battery was prepared using the above-prepared cathode and anode, although the sizes of the cut electrodes were different from those mentioned above. Specifically, the cathode and anode were cut into rectangular shapes, between which a polyolefin separator was placed, and the resulting laminate was wound in a longitudinal direction into a flat (oblate) shape to give a bundle of electrodes. This bundle of electrodes and the electrolyte solution were placed in a prismatic (rectangular) can, which was lidded, yielding a prismatic battery. The prepared prismatic battery was subjected to three cycles of charging to 4.2 V and then discharging to 2.5 V, and initial properties of the prismatic battery were determined.

The prismatic battery was then charged to 4.2 V and placed and stored in a thermostat bath at 85° C. for 24 hours. After that, the battery was cooled to room temperature and the thickness thereof was measured. The thickness of the battery was measured at the center point of the battery, and swelling of the battery was determined based on a change in thickness of the battery between before and after heating.

<Assessment of Amount of Gas Generation>

Batteries used in the assessment of laminated battery were subjected to three cycles of charging and discharging, then charged to 4.2 V and disassembled, from which cathodes corresponding to two laminated batteries were retrieved. The retrieved cathodes together with a fresh portion of the electrolyte solution were placed in a small laminate bag. The laminate bag was evacuated and hermetically sealed, and the volume of the laminate bag was measured. This laminate bag was placed in a thermostat bath at 85° C. and stored therein for 24 hours. After that, the laminate bag was cooled to room temperature and the volume thereof was measured again. The amount of gas generation derived from the cathode was determined based on a change in volume of the bag between before and after heating.

Example 1

The procedure to perform Example 1 has been shown above. Therefore, the results of assessments will be shown below.

The cycle assessment using a laminated battery revealed that the laminated battery had a capacity ratio (cycle efficiency:efficiency after 100 cycles) of 85%. A prismatic battery was found to have an initial capacity of 760 mAh. After storage at a high temperature, the prismatic battery showed an increase in thickness of 1.2 mm. The assessment of amount of gas generation revealed that gas generation occurred in an amount of 0.16 mL.

Example 2

In this example, dilithium squarate was used as a compound of Chemical Formula (1), and the NCA cathode material and dilithium squarate in a weight ratio of 100:0.01 were treated through mechanochemical process. This procedure gave a film formed on the cathode material in an amount of 0.01 part by weight per 100 parts by weight of the cathode material. The other configuration is the same as in Example 1.

The cycle assessment using a laminated battery revealed that the laminated battery had a capacity ratio (cycle efficiency) of 82%. A prismatic battery was found to have an initial capacity of 760 mAh. After storage at a high temperature, the prismatic battery showed an increase in thickness of 1.4 mm. The assessment of amount of gas generation revealed that gas generation occurred in an amount of 0.23 mL.

Example 3

In this example, dilithium squarate was used as a compound of Chemical Formula (1), and the NCA cathode material and dilithium squarate in a weight ratio of 100:10 were treated through mechanochemical process. This procedure gave a film formed on the cathode material in an amount of 10 parts by weight per 100 parts by weight of the cathode material. The other configuration is the same as in Example 1.

The cycle assessment using a laminated battery revealed that the laminated battery had a capacity ratio (cycle efficiency) of 68%. A prismatic battery was found to have an initial capacity of 730 mAh. After storage at a high temperature, the prismatic battery showed an increase in thickness of 1.0 mm. The assessment of amount of gas generation revealed that gas generation occurred in an amount of 0.09 mL.

Example 4

In this example, dilithium squarate was used as a compound of Chemical Formula (1), and the NCA cathode material and dilithium squarate in a weight ratio of 100:5 were treated through mechanochemical process. This procedure gave a film formed on the cathode material in an amount of 5 parts by weight per 100 parts by weight of the cathode material. The other configuration is the same as in Example 1.

The cycle assessment using a laminated battery revealed that the laminated battery had a capacity ratio (cycle efficiency) of 84%. A prismatic battery was found to have an initial capacity of 750 mAh. After storage at a high temperature, the prismatic battery showed an increase in thickness of 1.1 mm. The assessment of amount of gas generation revealed that gas generation occurred in an amount of 0.10 mL.

Example 5

This example adopted the same configuration and procedure as in Example 1, except for using dilithium rhodizonate as a compound of Chemical Formula (1).

The cycle assessment using a laminated battery revealed that the laminated battery had a capacity ratio (cycle efficiency) of 85%. A prismatic battery was found to have an initial capacity of 770 mAh. After storage at a high temperature, the prismatic battery showed an increase in thickness of 1.2 mm. The assessment of amount of gas generation revealed that gas generation occurred in an amount of 0.13 mL.

Example 6

In this example, dilithium squarate was used as a compound of Chemical Formula (1), and the same configuration and procedure as in Example 1 were adopted, except for using $LiCoO_2$ as a cathode active material.

The cycle assessment using a laminated battery revealed that the laminated battery had a capacity ratio (cycle efficiency) of 84%. A prismatic battery was found to have an initial capacity of 680 mAh. After storage at a high temperature, the prismatic battery showed an increase in thickness of 0.4 mm. The assessment of amount of gas generation revealed that gas generation occurred in an amount of 0.05 mL.

Example 7

In this example, the same configuration and procedure as in Example 1 were adopted, using dilithium squarate as a compound of Chemical Formula (1), except for using $LiCoO_2$ as a cathode active material as in Example 6 and except for increasing charge voltage to 4.4 V.

The cycle assessment using a laminated battery revealed that the laminated battery had a capacity ratio (cycle efficiency) of 84%. A prismatic battery was found to have an initial capacity of 740 mAh. After storage at a high temperature, the prismatic battery showed an increase in thickness of 0.8 mm. The assessment of amount of gas generation revealed that gas generation occurred in an amount of 0.08 mL.

Comparative Example 1

This comparative example adopted the same configuration and procedure as in Example 1, except for not using a compound of Chemical Formula (1) and using the NCA cathode material without any treatment.

The cycle assessment using a laminated battery revealed that the laminated battery had a capacity ratio (cycle efficiency) of 83%. A prismatic battery was found to have an initial capacity of 760 mAh. After storage at a high temperature, the prismatic battery showed an increase in thickness of 1.8 mm. The assessment of amount of gas generation revealed that gas generation occurred in an amount of 0.33 mL.

Comparative Example 2

This comparative example adopted the same configuration and procedure as in Example 1, except for not using a compound of Chemical Formula (1), and instead, providing a layer of lithium carbonate through mechanochemical process.

The cycle assessment using a laminated battery revealed that the laminated battery had a capacity ratio (cycle efficiency) of 73%. A prismatic battery was found to have an initial capacity of 700 mAh. After storage at a high temperature, the prismatic battery showed an increase in thickness of 3 mm. In the assessment of amount of gas generation, the cell used in the measurement broke, making the assessment of amount of gas generation unable to continue.

Comparative Example 3

This comparative example adopted the same configuration and procedure as in Example 6, using $LiCoO_2$ as a cathode active material, except for not applying a film thereto.

The cycle assessment using a laminated battery revealed that the laminated battery had a capacity ratio (cycle efficiency) of 83%. A prismatic battery was found to have an initial capacity of 680 mAh. After storage at a high temperature, the prismatic battery showed an increase in thickness of 0.5 mm. The assessment of amount of gas generation revealed that gas generation occurred in an amount of 0.06 mL.

Comparative Example 4

This comparative example adopted the same configuration and procedure as in Comparative Example 3, using $LiCoO_2$ as a cathode active material and not applying a film thereto, except for increasing charge voltage to 4.4 V.

The cycle assessment using a laminated battery revealed that the laminated battery had a capacity ratio (cycle efficiency) of 82%. A prismatic battery was found to have an initial capacity of 740 mAh. After storage at a high temperature, the prismatic battery showed an increase in thickness of 1.5 mm. The assessment of amount of gas generation revealed that gas generation occurred in an amount of 0.22 mL.

Table 1 shows a summary of the results of the above investigations.

TABLE 1

| | Cathode material | Film component | Amount of film | Cycle efficiency (after 100 cycles) | Initial capacity [mAh] | Increase in thickness [mm] | Amount of gas generation [mL] | Charge voltage [V] |
|---|---|---|---|---|---|---|---|---|
| Example 1 | $LiNi_{0.6}Co_{0.2}Al_{0.2}O_2$ | Dilithium squarate | 1.0 part by weight | 85% | 760 | 1.2 | 0.16 | 4.2 |
| Example 2 | $LiNi_{0.6}Co_{0.2}Al_{0.2}O_2$ | Dilithium squarate | 0.01 part by weight | 82% | 760 | 1.4 | 0.23 | 4.2 |
| Example 3 | $LiNi_{0.6}Co_{0.2}Al_{0.2}O_2$ | Dilithium squarate | 10 parts by weight | 68% | 730 | 1.0 | 0.09 | 4.2 |
| Example 4 | $LiNi_{0.6}Co_{0.2}Al_{0.2}O_2$ | Dilithium squarate | 5 parts by weight | 84% | 750 | 1.1 | 0.10 | 4.2 |
| Example 5 | $LiNi_{0.6}Co_{0.2}Al_{0.2}O_2$ | Dilithium rhodizonate | 1.0 part by weight | 85% | 770 | 1.2 | 0.13 | 4.2 |
| Example 6 | $LiCoO_2$ | Dilithium squarate | 1.0 part by weight | 84% | 680 | 0.4 | 0.05 | 4.2 |
| Example 7 | $LiCoO_2$ | Dilithium squarate | 1.0 part by weight | 84% | 740 | 0.8 | 0.08 | 4.4 |

TABLE 1-continued

| | Cathode material | Film component | Amount of film | Cycle efficiency (after 100 cycles) | Initial capacity [mAh] | Increase in thickness [mm] | Amount of gas generation [mL] | Charge voltage [V] |
|---|---|---|---|---|---|---|---|---|
| Com. Ex 1 | LiNi$_{0.6}$Co$_{0.2}$Al$_{0.2}$O$_2$ | — | | 83% | 760 | 1.8 | 0.33 | 4.2 |
| Com. Ex. 2 | LiNi$_{0.6}$Co$_{0.2}$Al$_{0.2}$O$_2$ | Lithium carbonate | 1.0 part by weight | 73% | 700 | 3.0 | — | 4.2 |
| Com. Ex. 3 | LiCoO$_2$ | — | | 83% | 680 | 0.5 | 0.06 | 4.2 |
| Com. Ex. 4 | LiCoO$_2$ | — | | 82% | 740 | 1.5 | 0.22 | 4.4 |

Comparison between Comparative Example 1 and Comparative Example 2 demonstrates that the battery of Comparative Example 2 showed increase in swelling, indicating that some compounds to be used as the film do not suppress but contrarily accelerate the swelling even when the compounds include lithium. This means that the swelling of a battery is effectively suppressed not by the presence of a film of some kind in the cathode active material but by the presence of preferably a layer of an oxocarbonic acid and more preferably a layer of an oxocarbonic acid neutralized with lithium, which is represented by Chemical Formula (1).

Comparison between Examples 1 to 5 and Comparative Example 1 and comparison of Examples 6 and 7 with Comparative Examples 3 and 4 demonstrate that the presence of a suitable film on the surface of cathode material particles suppresses the swelling of the battery, regardless of the composition of the cathode material. Comparison of Examples 6 and 7 with Comparative Examples 3 and 4 demonstrates that the presence of a suitable film on the surface of the cathode material particles improves the chemical stability of the cathode active material when the battery is charged to a high voltage, further suppresses the swelling of the battery and improves cycle properties.

With reference to Examples 1 to 4, the film, when included in an amount of more than 0.001 part by weight per 100 parts by weight of the cathode material, furthermore satisfactorily suppresses the swelling of the battery. The film, when included in an amount of less than 10 parts by weight per 100 parts by weight of the cathode material, improves the cycle efficiency (cycle properties) and the initial capacity. Accordingly, the film is preferably included in an amount of more than 0.001 part by weight and less than 10 parts by weight per 100 parts by weight of the cathode material, more preferably included in an amount of 0.01 part by weight or more and 5 parts by weight or less per 100 parts by weight of the cathode material, and furthermore preferably included in an amount of 1.0 part by weight or more and 2 parts by weight or less per 100 parts by weight of the cathode material.

While the present invention has been described in detail with reference to the examples thereof, it should be noted that the present invention is not featured only by the above-described examples and is not limited to the above-described examples.

What is claimed is:
1. A cathode for a lithium ion rechargeable battery, comprising:
  a cathode active material comprising:
    particles, each of the particles including a cathode material capable of intercalating and deintercalating lithium ions; and
    a film being formed on at least part of surfaces of the particles,
    wherein the film includes a compound represented by Chemical Formula (1):

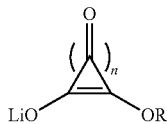

(1)

wherein n is an integer of from 1 to 5 and R represents lithium (Li) or hydrogen (H),
  wherein the compound represented by Chemical Formula (1) is included in an amount of more than 0.001 part by weight and less than 10 parts by weight per 100 parts by weight of the cathode material.

2. The cathode for a lithium ion rechargeable battery according to claim 1,
  wherein the film further includes a compound represented by Chemical Formula (2):

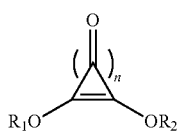

(2)

wherein n is an integer of from 1 to 5, R$_1$ represents an alkali metal other than lithium, and R$_2$ represents an alkali metal or hydrogen.

3. The cathode for a lithium ion rechargeable battery according to claim 1,
  wherein A$_2$CO$_3$ or AOH is formed on at least part of the surfaces of the particles, where A represents an alkali metal.

4. The cathode for a lithium ion rechargeable battery according to claim 1,
  wherein the cathode material includes nickel.

5. The cathode for a lithium ion rechargeable battery according to claim 1,
  wherein the compound represented by Chemical Formula (1) is included in an amount of 0.01 part by weight or more and 5 parts by weight or less per 100 parts by weight of the cathode material.

6. A lithium ion rechargeable battery comprising the cathode of claim 5, an anode, and an electrolyte.

7. The lithium ion rechargeable battery according to claim 6,
  wherein the lithium ion rechargeable battery is a prismatic battery.

8. A lithium ion rechargeable battery comprising the cathode of claim 1, an anode, and an electrolyte.

9. The lithium ion rechargeable battery according to claim 8, wherein the lithium ion rechargeable battery is a prismatic battery.

10. The cathode for a lithium ion rechargeable battery according to claim 1, wherein the film further includes at least one of an oxocarbonic acid and a salt of oxocarbonic acid with an alkali metal in addition to the compound represented by Chemical Formula (1).

11. The cathode for a lithium ion rechargeable battery according to claim 1, wherein an alkali metal deposit of at least one of $A_2CO_3$ or AOH is formed on the surfaces of the particles, where A represents an alkali metal, and the compound represented by Chemical Formula (1) is formed on the alkali metal deposit.

* * * * *